No. 760,605. PATENTED MAY 24, 1904.
J. B. BARTHOLOMEW.
VEHICLE AXLE.
APPLICATION FILED AUG. 5, 1901.
NO MODEL. 2 SHEETS—SHEET 1.
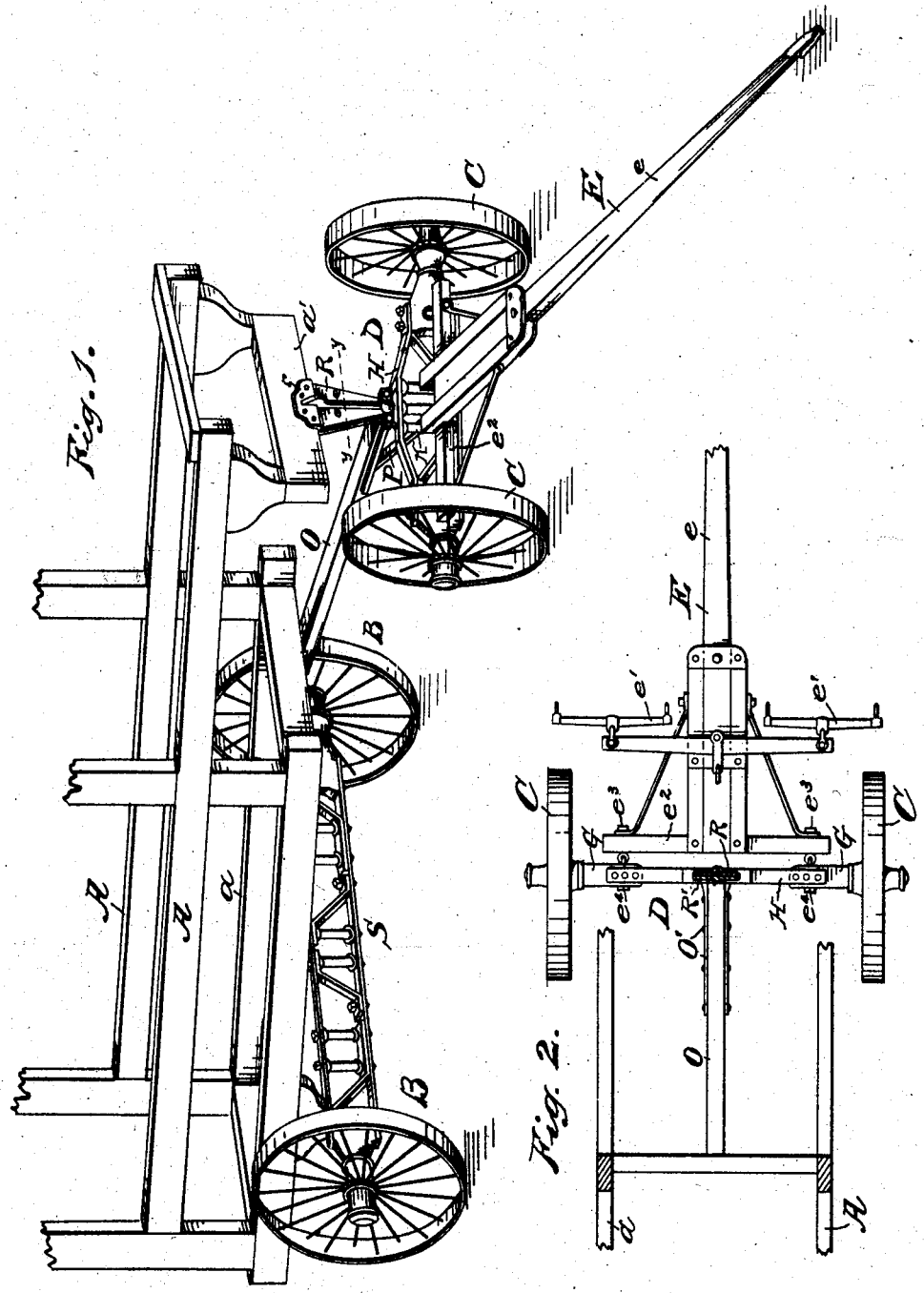
WITNESSES.
Albert K. Williams Jr.
C. N. Woodward.
John B. Bartholomew INVENTOR.
By H. H. Bliss ATTORNEY.

No. 760,605. PATENTED MAY 24, 1904.
J. B. BARTHOLOMEW.
VEHICLE AXLE.
APPLICATION FILED AUG. 5, 1901.
NO MODEL. 2 SHEETS—SHEET 2.
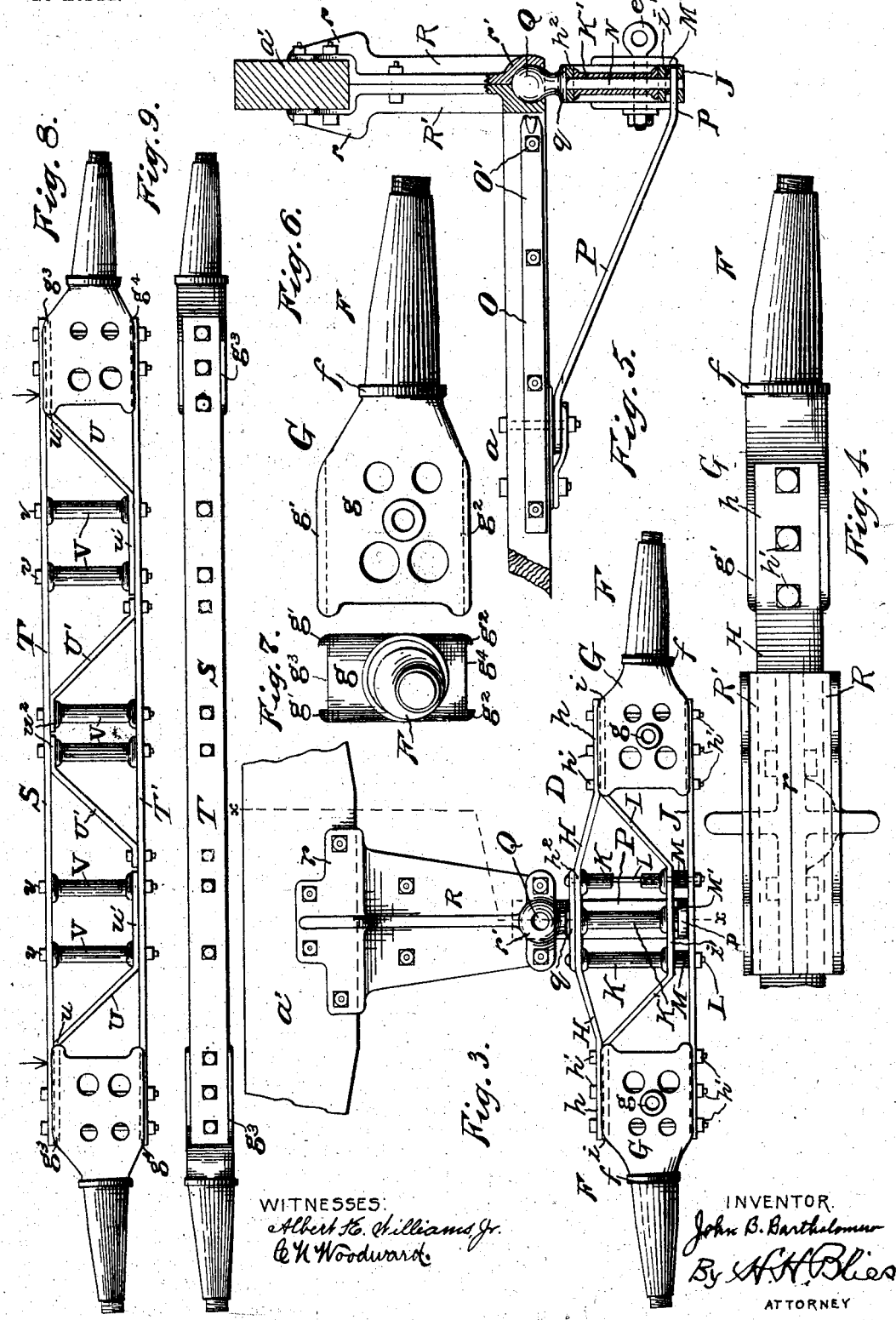
WITNESSES:
Albert E. Williams Jr.
E. N. Woodward.
INVENTOR.
John B. Bartholomew
By H. H. Bliss
ATTORNEY No. 760,605. Patented May 24, 1904.

UNITED STATES PATENT OFFICE.

JOHN B. BARTHOLOMEW, OF PEORIA, ILLINOIS, ASSIGNOR TO AVERY MANUFACTURING COMPANY, OF PEORIA, ILLINOIS, A CORPORATION OF ILLINOIS.

VEHICLE-AXLE.

SPECIFICATION forming part of Letters Patent No. 760,605, dated May 24, 1904.

Application filed August 5, 1901. Serial No. 70,963. (No model.)

*To all whom it may concern:*

Be it known that I, JOHN B. BARTHOLOMEW, a citizen of the United States, residing at Peoria, in the county of Peoria and State of Illinois, have invented certain new and useful Improvements in Axles, of which the following is a specification, reference being had therein to the accompanying drawings.

This invention relates to an improvement in axles for heavy vehicles or vehicle-frames, particularly such as are used for supporting and transporting threshing and separating mechanisms.

Figure 1 is a perspective of the framework of a vehicle or machine of this sort shown as supported upon axles constructed with my improvements. Fig. 2 is a plan view of the front part of the running-gear. Fig. 3 is a front view of the front axle, showing part of the framework and connecting devices. Fig. 4 is a plan view of the parts in Fig. 3. Fig. 5 is a vertical section on the line $x\,x$, Fig. 3. Fig. 6 is a front view of one of the skein-carriers detached. Fig. 7 is a front view of Fig. 6. Fig. 8 is a front view of the rear axle, and Fig. 9 is a top view thereof.

In the drawings, A indicates the main body part of the framework of a threshing and separating machine, $a$ being a rear lower part and $a'$ being the downward-extending part at the front end. This framework is supported upon rear ground-wheels B B and front wheels C C. The front wheels are on the front axle, which as a whole is indicated by D and to which is attached the draft mechanism at E. This axle D is constructed as follows: F F indicate the skeins or stub-axles. Each of these is formed upon a carrier-block G, the carrier and the axle or skein part being cast integral. The carrier proper consists of a plate or block-like part, the body of which is indicated by G and having upward-extending flanges $g'$ and downward-extending flanges $g^2$, these providing rabbets $g^3$ and $g^4$ between them. The spindle or stub-axle part F is peculiarly arranged in relation to the carrier part G and to the transverse and longitudinal lines of the vehicle. It will be seen that the longitudinal axle of the spindle part inclines downward and forward from the main longitudinal axis of the axle, so as to hold the wheel in an advantageous way to resist the pressure from the great weight of the vehicle and so as to give proper draft to the wheels. The flange $f$ at the inner end of the spindle is at right angles to the axis of the spindle and is therefore correspondingly inclined to the longitudinal axis of the axle and accordingly provides the proper abutting surface of the wheel-hub. There is a carrier and spindle or skein at each end of the axle, these being duplicates one of the other. With these I combine for the front axle a truss-frame having inclined braces, horizontal members, and struts. Of this truss-frame the top or upper element is indicated by H, the intermediate or inclined element by I, the bottom element by J, and the struts by K K'. The part H consists of a bar of wrought metal having the end foot-pieces $h$ adapted to fit in the rabbet $g^3$ in the spindle-carriers G between the flanges $g'$. The intermediate truss element I is formed with foot-pieces $i$, that also fit in the rabbets $g^3$ under the foot-plates $h$ of the upper element H, both the latter being fastened by the vertical bolts $h'$. The intermediate element I also has the bottom horizontal part $i'$. Between this horizontal part and the horizontal part $h^2$ of the upper element H are arranged the struts K K'. These consist of tubular standards which have a firm bearing between the said two horizontal plate parts $h^2$ and $i'$ and by their coaction with the parts H and I and the bottom element J provide great strength and resistance to transverse strains for the axle as a whole. This lower element J consists of a section of flat wrought metal which fits at the ends in the rabbets $g^4$ between the flanges $g^2$ and is held by the bolts $h'$. At the center it is connected to the elements H and I of the truss by means of bolts L, which are located in the tubular struts K K and also pass through short tubular strut-like thimbles M M. The bolts L permit the central parts of the truss elements to be firmly bound together. The central strut part K' not only serves to assist in taking the vertical strains of the parts H and I, but also to receive the downwardly-projecting pin N, forming part of the swivel mechanism. Between the lower part $i'$ of the truss element I and the bottom bar J there is a supplemental spacing-thimble M', held in place by this pin.

O indicates a reach or bar extending forward from the rear lower part $a$ of the frame to the front axle, and it is connected to the latter by straps and bolts at O'.

P is an inclined brace extending from the reach to the lower part of the axle, it having a foot-piece $p$ with an aperture which surrounds the thimble M'.

The axle is connected pivotally or so that it can swivel under the framework $a'$ by a ball-and-socket joint. Q is a ball formed with and carried by a plate $q$, integral with the pin N, this plate $q$ being secured upon the top of the central part $h^2$ of the truss element H. The socket part of the joint comprises two castings R R', having expanded upper ends $r$, bolted to the frame at $a'$ and cast with semispherical sockets $r'$, in which the ball Q fits when the halves R R' of the standard-casting are secured together.

The draft devices (indicated as a whole by E) comprise the tongue $e$, the double and whiffletrees at $e'$, the cross-bar $e^2$, and the couplings at $e^3$. These couplings consist of connected eyebolts, the bolts on the axle being indicated by $e^4$, they passing through the spindle or skein-carriers G, the latter having socketed apertures at $g$ to receive them. The draft being applied in this way, assurance is given that it shall be exerted at points as near to the wheels as possible, so as to prevent the latter from causing severe horizontal strains upon the axle.

The rear axle (indicated as a whole by S) is built up in a manner similar to that followed in forming the front one—that is to say, two castings are used, each comprising a spindle and spindle-carrier and each a counterpart of those of the front axle. A top truss element T and a bottom truss element T' are employed, fitted in the rabbets at $g^3$ $g^4$. The intermediate truss element is preferably made in sections U U'. Each of these has a central inclined part and a foot-plate at each end. The foot-plates $u$ of the end truss-sections U are fastened in the rabbets $g^3$. At the inner ends of these parts U there are foot-plates $u'$. V V are strut-thimbles between these plates $u'$ and the top truss element T, and bolts $v$ bind the parts firmly together. At the center of the inclined braces U' have foot-pieces $u^2$ at their upper ends interposed between the strut-thimbles and the top bar T. When the rear axle is constructed in this way, it cannot only be made exceedingly strong, though light, but can be provided of any length. Vehicles or mechanisms of the sort of threshing-machines vary considerably in width, and the axles can be readily made longer or shorter by increasing or decreasing the length of the bars T T' and the number of inclined truss-sections U U'.

Thus, considering both the front and the rear axle, it will be seen that they are built up of substantially the same three elements—to wit, the spindle-casting, the strut-thimbles, and sections of flat wrought metal of suitable length. Consequently the parts can be readily stored and manipulated in quantities in the factory and assembled with economy of labor and readily adapted to the various sizes and styles of structure.

What I claim is—

1. In an axle, the combination of the wheel-spindles, blocks carrying the same, a cross-piece uniting said blocks at the top, a cross-piece uniting said blocks at the bottom, the inwardly and downwardly extending truss members attached to the tops of said blocks, strut members K between the lower connecting part of said truss members and the top cross-piece, strut members M between said connecting part of the truss members and the bottom cross-piece, and bolts uniting said cross-pieces and strut members, substantially as set forth.

2. In an axle, the combination of the spindle-carrying blocks, a cross-piece uniting said blocks at the top, a cross-piece uniting said blocks at the bottom, the inwardly and downwardly extending truss members attached to the tops of said blocks and having means whereby they are connected with the inner part of the bottom cross-piece, and wheel-spindles on said blocks having their axes inclined forward relative to the line of the axle, substantially as set forth.

3. In an axle, the combination of the wheel-spindles, blocks carrying the same and having the flanges $g^2$, $g^3$ on their upper and lower sides, top and bottom cross-pieces fitting respectively between said flanges at the top and bottom of said blocks and vertically bolted thereto, and truss members secured between said cross-pieces, substantially as set forth.

4. In an axle, the combination of the blocks which carry the spindles for the wheels, the top and bottom connecting-pieces between and uniting the blocks, the inclined truss elements arranged between the cross-pieces and having foot portions substantially parallel with the cross-pieces, hollow thimble-like struts, and connecting-bolts passing through the cross-pieces, struts, and foot portions of the truss elements and uniting them all together, substantially as set forth.

5. In an axle, the combination of the wheel-spindles, top and bottom cross-pieces H and J, blocks G carrying said spindles and united with said top and bottom cross-pieces, and a draft means connected directly with said blocks between said cross-pieces, said blocks being formed with the perforations $g$, substantially as set forth.

6. In an axle, the combination of the blocks carrying the spindles for the wheels, the cross connecting-pieces uniting the blocks, and means carried by the blocks for connection with the draft devices at each side of and independently of said cross connecting-pieces, substantially as set forth.

7. In an axle, the combination of the blocks which carry the spindles for the wheels, provided along their upper and lower edges with flanges whereby there are formed rabbets, and flat plates of metal seated in the said rabbets and attached to the said blocks, whereby they constitute laterally-braced connecting elements between the said blocks, substantially as set forth.

8. An axle, the wheel-spindles of which incline downward and forward from the main longitudinal axis of the axle, and the flanges $f$ at the inner ends of the spindles and situated respectively in planes at right angles to the axes of the said spindles, and inclined forward toward each other, substantially as set forth.

9. An axle comprising blocks which carry the wheel-spindles, top and bottom cross connecting-pieces between the said blocks, and the centrally-disposed swivel connection for the vehicle-frame carried by the top connecting-piece of the axle, substantially as set forth.

10. A vehicle-axle comprising blocks which carry the spindles for the wheels, top and bottom cross connecting-pieces between the said blocks, and a bolt connecting the said top and bottom pieces, the upper portion of the bolt being extended beyond the top piece and formed to constitute a part of the swivel connection with the frame of the vehicle, substantially as set forth.

11. A vehicle-axle comprising the blocks carrying the spindles for the wheels, the top and bottom cross-pieces connecting said blocks, and a spherical or ball-like connection Q secured to and extending upward from the top connecting-piece, and arranged to constitute a portion of a swivel connection with the vehicle-frame, substantially as set forth.

12. A vehicle-axle comprising in combination the blocks which carry the spindles for the wheels, top and bottom connecting cross-pieces between the said blocks, the bolt N uniting the said cross-pieces and provided at its upper end with a spherical or ball-like head Q, and a thimble-like strut surrounding the said bolt between the top and bottom cross-pieces, substantially as set forth.

13. A vehicle-axle comprising in combination the blocks which carry the spindles for the wheels, the top and bottom cross connecting elements or pieces between the said blocks, the inclined truss elements between the said top and bottom pieces, the centrally-arranged struts also between the top and bottom pieces, and the bolt N provided with an extension which constitutes a portion of the swivel connection with the vehicle-frame, substantially as set forth.

14. In an axle, the combination of the spindles, a truss-frame carrying the same and comprising a central vertical strut member, and a ball member Q of a ball-and-socket joint connected with said strut member, substantially as set forth.

In testimony whereof I affix my signature in presence of two witnesses.

JOHN B. BARTHOLOMEW.

Witnesses:
D. C. CHIPMAN,
L. W. HAZARD.